Oct. 24, 1939.                B. E. SIBLEY                2,177,293
                          OIL TESTING APPARATUS
                           Filed Feb. 13, 1937                2 Sheets-Sheet 1

INVENTOR
Barrett E. Sibley
BY
Thos. E. Hesfield
ATTORNEY

Oct. 24, 1939.  B. E. SIBLEY  2,177,293
OIL TESTING APPARATUS
Filed Feb. 13, 1937  2 Sheets-Sheet 2
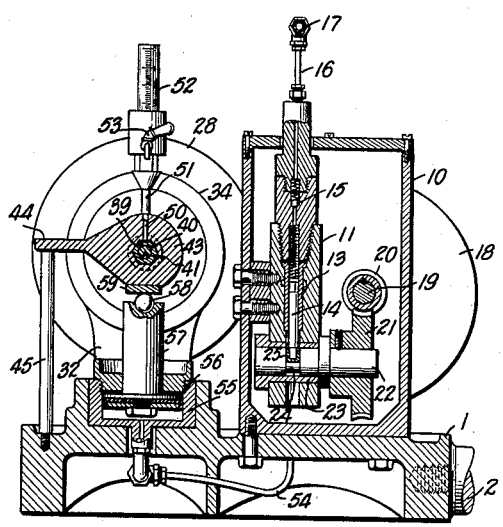
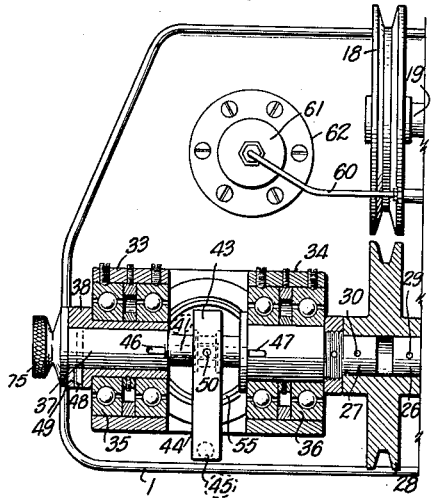
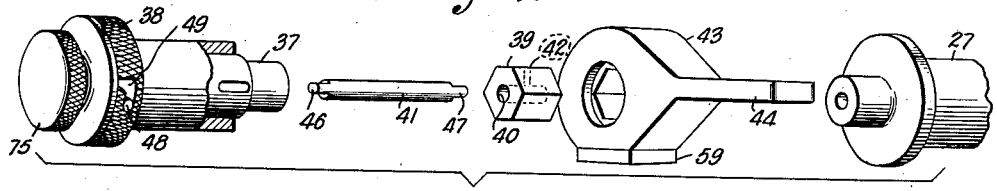
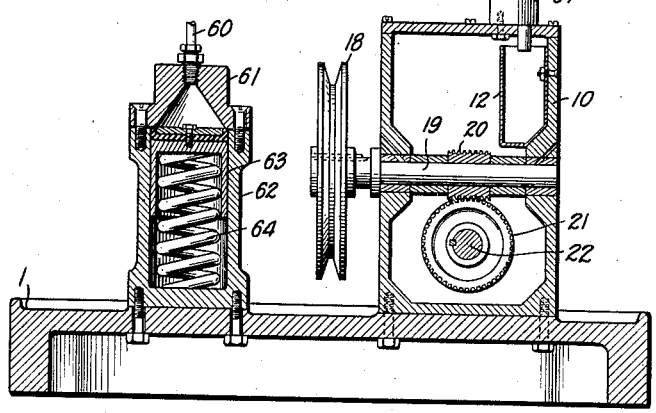
INVENTOR
Barrett E. Sibley
BY Thos. E. Scofield
ATTORNEY Patented Oct. 24, 1939

2,177,293

UNITED STATES PATENT OFFICE 2,177,293

OIL TESTING APPARATUS

Barrett E. Sibley, Ponca City, Okla., assignor to Continental Oil Company, Ponca City, Okla., a corporation of Delaware Application February 13, 1937, Serial No. 125,620

1 Claim. (Cl. 265—10)

My invention relates to oil testing apparatus and more particularly to a machine or apparatus for testing lubricating qualities and more especially the comparative load carrying ability of two lubricating oils.

Ascertaining the lubricating properties of lubricating oils is a difficult matter since results will vary not only in accordance with the lubricating properties of the oils being tested but also with the nature of the metallic surfaces moving on one another separated by the oil film, the temperature at which the test is conducted, the load applied, the speed of relative movement of the two surfaces, the rate at which the load is applied, the rate of oil fed to the test shaft, and the pressure at which the oil is applied.

If a test is conducted on one oil and the conditions noted, and it is attempted to duplicate these conditions with another oil, due to the many variable factors, it is possible for error to creep in.

One object of my invention is to provide a testing machine for comparing two lubricants in which the respective oils being tested are subjected to precisely the same conditions of testing with respect to the rate of loading, the rate of oil fed to the test shaft, the rate of speed of the test shaft, the temperature, the degree of loading and any other factors or conditions which might develop during testing.

Another object of my invention is to provide a machine for testing the film strength of the oil film established by an oil between moving parts to be lubricated.

Another object of my invention is to provide an apparatus for ascertaining in a simple and convenient manner, the film strength of a lubricating oil.

Another object of my invention is to provide a handy assembly for testing the film strength of lubricants, which assembly is easy of operation, light enough in weight to be portable and strong enough in structure to be durable.

Other and further objects of my invention will appear from the following description.

In general, my invention contemplates the provision of a pair of test bearings in which test shafts are adapted to rotate, driven from a common source and in which identical conditions of quantity of loading, rate of loading, speed of rotation and oil supply are provided so that comparative results may be obtained.

In the accompanying drawings which form part of the instant specification and which are to be read in conjunction therewith, and in which like reference numerals are used to indicate like parts in the various views;

Figure 3 is a sectional view taken on a line 3—3 of Figure 1.

Figure 4 is a sectional view taken on a line 4—4 of Figure 1.

Figure 5 is a sectional view taken on a line 5—5 of Figure 2.

Figure 6 is an enlarged fragmentary sectional view taken on a line 6—6 of Figure 1.

Figure 7 is an isometric view of a portion of the test apparatus showing the mode of assembly.

Figure 1:
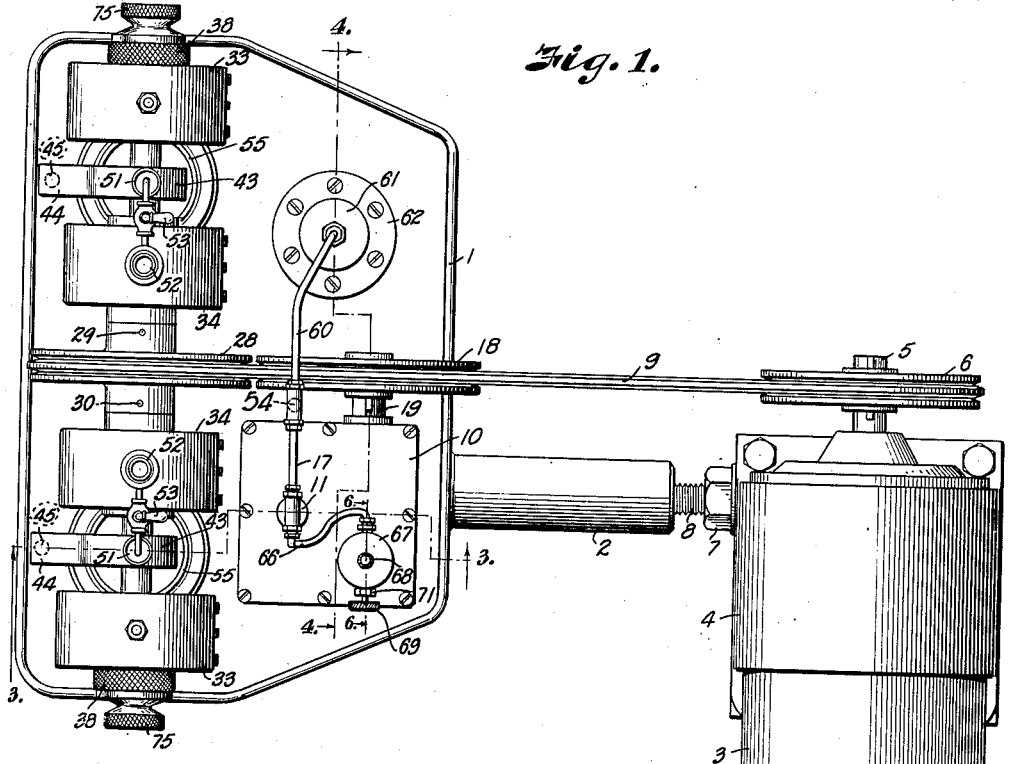
Figure 1 is a plan view of my testing assembly.
Figure 2:
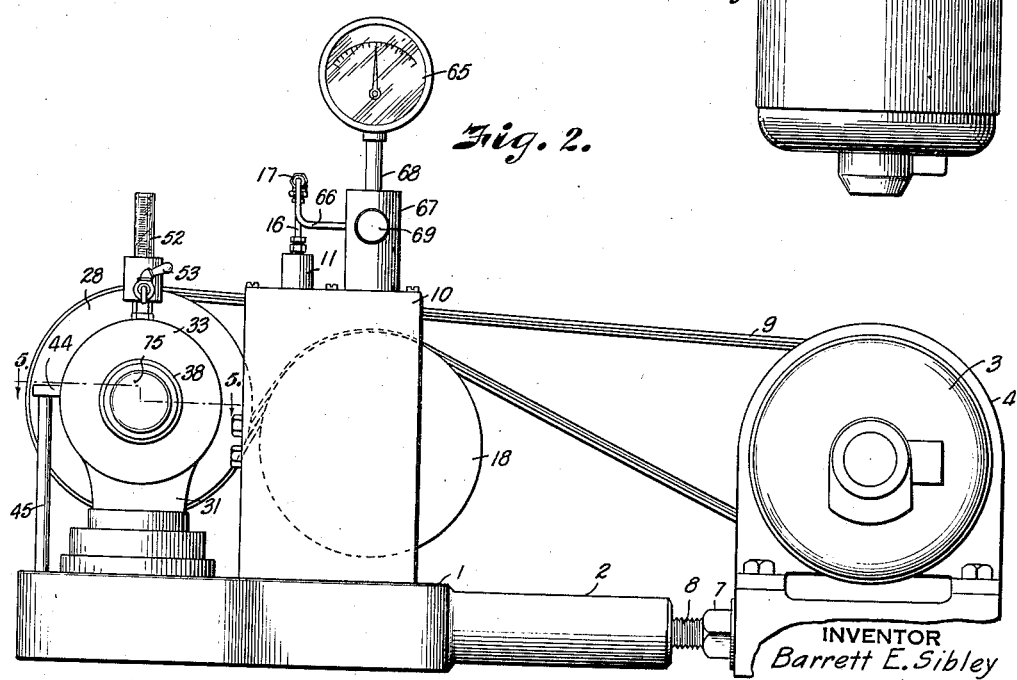
Figure 2 is a side elevation of the testing assembly shown in Figure 1.

More particularly referring now to the drawings, to a suitable bed plate 1 I secure a motor spacer and belt tightener 2 which spaces an electric motor 3 which, through a suitable transmission housed in housing 4, is adapted to drive a shaft 5 to which is keyed a driving sheave 6. The motor is of a constant speed type and may be, for example, a one-third horsepower motor, designed for 310 R. P. M. The gear housed in housing 4 may be a planetary gear and a ratio of 5.57 to 1 has been found satisfactory in use. By rotating the head 7 of stud bolt 8, the motor assembly may be moved outwardly or inwardly to tighten the belt 9 which drives the oil pump and testing shafts as hereinafter will be more fully pointed out. Upon the bed plate 1, I mount a pump casing 10 in which a reciprocating pump assembly 11 is mounted. An oil reservoir 12, adapted to supply oil to the pump 11, is also mounted within the casing 10. The pump assembly 11 is provided with a pump cylinder 13 in which a pump plunger 14 is adapted to be reciprocated to pump oil taken from reservoir 12 past check valve 15, through oil line 16, into oil manifold 17. A sheave 18 is keyed to shaft 19, to which is keyed within casing 10 a worm 20. The worm is adapted to rotate worm wheel 21 which is secured to shaft 22. A pump bushing 23 houses crank pin 24 which is adapted to reciprocate plunger shoe 25 for reciprocating the pump plunger 14. The belt 9 also drives main drive sheave 28 which drives drive shafts 26 and 27 through shear pins 29 and 30 respectively.

Mounted on bed plate 1 are suitable supports 31 and 32, carrying bearing housings 33 and 34 respectively. Bearing housing 33 houses ball bearings 35 and bearing housing 34 houses ball bearings 36. A pilot shaft 37 is provided with a bushing 38 for rotation on ball bearings 35. Drive shaft 27 extends into ball bearings 36. The test bearing 39 is made in the form of a hexagon through which is drilled a carefully reamed, axial opening 40 in which a test shaft 41 is adapted to rotate with a known pre-determined clearance.

It will be observed that test bearing 39 and test shaft 41 must be accurately made in order to obtain reproducible and uniformly accurate results. Likewise, they must be made out of the same materials. If desired, the test bearings may be made out of different material and the same oil employed in order to obtain comparative results on two bearing metals with a single test. An oil hole 42 is provided at the top of the test bearing 39 as can readily be seen by reference to Figure 7. The test bearing is adapted to be held by a test bearing holder 43. The holder 43 is provided with a lug 44 adapted to rest upon a holder support rod 45, mounted in bed plate 1. The test holder lug 44 and the support rod 45 prevent the test holder bearing from rotating during a test upon rotation of the test shaft. The test shaft 41 is provided with flattened ends 46 and 47 adapted to fit in correspondingly shaped sockets in the pilot shaft 37 and drive shaft 27 respectively. The pilot shaft 37 is provided with a pin 48 which is adapted to lock in a bayonet slot 49, formed in the head of bushing 38. The flattened end 46 fits within pilot shaft 37 with sufficient friction to enable the removal of the pilot shaft to carry with it the test shaft 41 and this enables the assembly and removal of a series of test shafts and test bearings for respective tests in a simple and convenient manner. The test holder 43 is drilled with an oil duct 50 which is aligned with oil duct 42 in the test bearing. An oil feeder funnel 51 communicates with oil duct 50. A test oil reservoir 52 which is in the form of a calibrated glass tube, is adapted to contain the sample of the oil to be tested. A valve 53 is provided for removing oil from the test oil reservoir 52 for transfer to the test oil feeder funnel 51.

The load is applied to the test bearings through a hydraulic system connected with manifold 17 whereby the output of the pump assembly 11 is transferred through conduit 54 to the interior of loading cylinder 55 in which a loading piston 56 is assembled. The loading piston 56 carries a loading plunger 57 which is adapted to apply a load upon test bearing holder 43 through ball bearing 58 which abuts test bearing holder shoe 59. Also connected to manifold 17 is a conduit 60 which is adapted to discharge into spring loading cylinder head 61 of spring holding cylinder 62 in which there is housed a spring loading piston 63 and a loading spring 64. The loading spring is a fairly heavy spring and may be of about 2" outside diameter, made of ⅜" diameter steel having a 3½" free length in seven coils. After the thrust against the test bearing reaches a predetermined point, a portion of the oil being pumped by the pumping assembly 1 will force the spring loading piston downwardly against the action of the loading spring. The compression of the spring exerts a pressure upon the hydraulic system which is transferred to the loading piston and loading plunger 57. Conduit 66 communicates with manifold 17 and is adapted to convey oil under the pressure of the hydraulic system to the master gauge support 67 on which is supported master gauge 65. The pressure of the hydraulic system is transmitted to the gauge 65 through conduit 68 which is in communication with the pressure system as can readily be seen by reference to Figure 6. It will be obvious that the pressure imposed upon the test bearing will be indicated by the master gauge. The gauge may be calibrated directly in pounds per square inch. In order to release the load upon the test bearing, I provide a release valve 69 which, upon being opened, releases the oil under pressure through duct 70 to the reservoir 12. The release valve is provided with a packing nut 71 to prevent the escape of oil under pressure.

When it is desired to make a test, fresh test bearings and test shafts are assembled in the position shown in Figure 5, it being understood of course that shear pins 29 and 30 are in place. These shear pins may be made of any suitable material, as for example 12-gauge brass metallizing wire. Samples of lubricating oils to be tested are then placed in the test sample reservoirs 52 and valves 53 are opened to permit a portion of the sample to run into the feed funnels 51. When the feed funnels are filled to a predetermined point, the valves 53 are closed and the apparatus is ready to begin the test. The motor 3 is then started and its operation will drive pump pulleys 18 and 28 pumping oil through the hydraulic system and applying pressure upon the test bearings through test bearing holders 43 and also applying pressure upon the loading spring in loading spring cylinder 62, thus insuring a uniform pressure throughout the hydraulic system, irrespective of strokes of the reciprocating hydraulic system pump plunger. The pressure applied in pounds per square inch is read directly from the master gauge 65. It will be observed that, as long as shear pins 30 and 29 are intact, test drive shafts 26 and 27 will be rotated, thus driving test shafts 41 which, in turn will drive pilot shafts 37. The ends of pilot shafts 37 terminate in knurled knobs 75 which can be observed by the operator. As soon as the motor is started, the oil in the feed funnel will drop slightly in level due to a portion of it being used to establish an oil film between the test shaft and the test bearing. The valves 58 are opened slightly to permit a constant slow feed of oil during the test. The amount of valve opening can be readily determined in practice by observing the level in the feed funnels. When the load becomes so great that the oil film between a test bearing and the test shaft is ruptured, the two test pieces will seize and friction will prevent the test shaft from turning in the test bearing. The test bearing cannot turn because it is held by the test bearing holder 43 as will be obvious from the description hereinbefore. Upon seizure the shear pin of the particular test drive shaft driving the seized shaft will shear. At this point, the pressure upon the gauge can be read and since it is calibrated in pounds per square inch, the load carrying ability of the particular sample load noted. The shearing of the shear pin on the side where seizure occurred will permit the main driving sheave to operate without any reduction in speed. The other side will continue to operate as described and pressure will continue to build up until either seizure has occurred or a predetermined load is reached, at which time the machine may be stopped.

It will be observed that I have accomplished the objects of my invention. I have provided a testing machine for testing lubricating qualities of hydrocarbon oils and more particularly their load carrying abilities wherein two oils are tested simultaneously under identical conditions of test so that an accurate comparison may be obtained.

It will be understood that certain features and sub-combinations are of utility and may be employed without reference to other features and sub-combinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, what I claim is:

In an oil-testing apparatus, a prime mover, a hydraulic pump and a driving shaft driven by said prime mover, a pair of test bearing holders, test bearings mounted within said respective holders, test shafts mounted for rotation within said respective test bearings, means including shear means for coupling said driving shaft to said test shafts, means for applying the hydraulic pressure developed by said hydraulic pump to said test bearing holders for transmission to said test bearings, and means for measuring the hydraulic pressure generated.

BARRETT E. SIBLEY.